US007509672B1

(12) United States Patent (10) Patent No.: US 7,509,672 B1
Horwitz et al. (45) Date of Patent: Mar. 24, 2009

(54) CROSS-PLATFORM SINGLE SIGN-ON DATA SHARING

(75) Inventors: Michael A. Horwitz, Berkley, MI (US); Kenneth W. O'Dell, Birmingham, MI (US); Dennis J. O'Flynn, Canton, MI (US); Carlos Devoto, Plymouth, MI (US)

(73) Assignee: Compuware Corporation, Detroit, MI (US)

( * ) Notice: Subject to any disclaimer, the term of this patent is extended or adjusted under 35 U.S.C. 154(b) by 723 days.

(21) Appl. No.: 10/817,275

(22) Filed: Apr. 1, 2004

(51) Int. Cl.
*G06F 21/00* (2006.01)
(52) U.S. Cl. ....................................................... 726/8
(58) Field of Classification Search ................ 726/8
See application file for complete search history.

(56) References Cited

U.S. PATENT DOCUMENTS 5,815,665 A 9/1998 Teper et al.
6,173,332 B1 * 1/2001 Hickman .................... 709/235
6,295,551 B1 * 9/2001 Roberts et al. .............. 709/205
7,225,464 B2 * 5/2007 Satyavolu et al. ............ 726/10

* cited by examiner

*Primary Examiner*—Gilberto Barron, Jr.
*Assistant Examiner*—Martin Jeriko P San Juan
(74) *Attorney, Agent, or Firm*—Fenwick & West LLP (57) ABSTRACT

Systems and methods of authentication and data sharing across applications and platforms based on a single authentication are described. The systems and methods allow a user, based on a single log on to an application, to be automatically logged on to other applications and to fetch and store preference, state, and setting data across enterprise computing systems that include multiple computing platforms and applications. A data registry stores authentication and non-authentication data. An interface for automatically executing authentication transactions for the applications and facilitating the share of non-authentication data is also provided. The non-authentication data is user configurable to provide flexible application support across the enterprise, such as through the preservation of state information, preferences, settings, and application data across multiple computers.

29 Claims, 7 Drawing Sheets

CROSS-PLATFORM SINGLE SIGN-ON DATA SHARING

BACKGROUND

1. Field of the Invention

The invention relates to the field of authentication-based data sharing, and more specifically to sharing data across a distributed computer system based on an initial sign-on.

2. Background of the Invention

The average computer user accesses a variety of computer applications in a number of settings. These applications may include a combination of local, LAN, and WAN applications hosted on a variety of operating platforms, such as Windows™, mainframe, Unix, Linux, or Macintosh™ platforms. The user may access these applications from a variety of locations over the course of a working day by utilizing a laptop, desktop, special use computer, kiosk, conference room terminal or other machine. Interruptions in workflow and changes in user location occur regularly over the course of a normal working day. Each time a user resumes her workflow, time must be spent logging on to applications and/or restoring settings or other data from a previous computing session.

Many of the applications a user accesses throughout the day will require the authentication of the user, most commonly through a sign-on transaction involving a user identifier and password. Each application and each platform may include its own procedures for generating, storing, and validating user sign-on transactions. As each application is started, it will generally require the user to follow its sign-on procedure. Each application may have different rules for acceptable user identifiers and passwords, including different combinations and patterns of letters, numerals, or other characters. Requiring multiple sign-on transactions by the user represents a productivity loss due to time and distraction, may discourage the adoption and use of some applications, and may require the user to manage multiple user identifiers and passwords.

Furthermore, there is often still a lag between the time a user launches and is authenticated on an application and when the user can be fully productive. Typically, a user will need to make adjustments to the application to reflect her preferred settings. Sometimes in order to access a file for use in one application, another file management program must be launched as well. Where more than one application is being used simultaneously—a common occurrence as a worker may need to monitor email, active jobs that are being processed, or other tasks while working in another application—or where tasks within the same application are being used, the user may also have to manually resize the window displays showing the different tasks.

When a user moves from one terminal to another, such information is lost and must be regenerated. In addition, temporary data such as the user's specific location within a file, the collection of files that are simultaneously open, and other information specific to a user's experience cannot be saved and retrieved easily. If the user changes terminals, or there are gaps between her active working times, both frequent occurrences in the workplaces, she must recreate the setting she left before she can be productive. During the course of a working day, much time is wasted across enterprises in authentication tasks, restoring preferences, settings, and application data as a user moves from one working location to another.

No single system for reducing the time wasted in logging on to single applications and constantly restoring non-authentication preference, setting, environment, and temporary data when users move across an enterprise currently exist. There are limited solutions for consolidating sign-on tasks, such as those offered by Netscape, Liberty Alliance, Plumtree, and Microsoft Passport. Enterprise systems for enabling single sign-on transactions for multiple applications across platforms include IBM Enterprise Identity Mapping ("EIM"), Siteminder, and ETrust. However none of these also allows for the capture, storage, and retrieval of authentication and non-authentication data across different users, platforms, and terminals.

Operation of IBM's EIM is illustrative of current approaches to providing a single user sign-on transaction for sign-on to multiple enterprise applications. IBM's EIM stores multiple user identities and related user authentication information from across user registries associated with OS platforms, applications, and middleware. The user identities are stored in a well-known data source accessible throughout the enterprise, such as a lightweight data access protocol ("LDAP") server. The IBM EIM provides common services across platforms for accessing the mappings. EIM allows a user to execute a sign-on transaction that generates an electronic validation ticket. That ticket is then used to validate the user to a predetermined set of systems and applications defined in the EIM data source based upon the user identities stores in that data source.

Although IBM's EIM and similar systems do support some form of single sign-on, they do not support the cross-platform sharing of non-authentication data. Because of this, integration among applications is limited. Further, they do not allow users to move among terminals while maintaining state, preference, and other application data. Thus there is a need for systems that automatically authenticate users and facilitate the sharing of data across an enterprise, thus allowing users to move seamlessly between terminals, applications, and platforms without having to recreate their workplace environment in each new setting.

BRIEF DESCRIPTION OF THE DRAWINGS

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
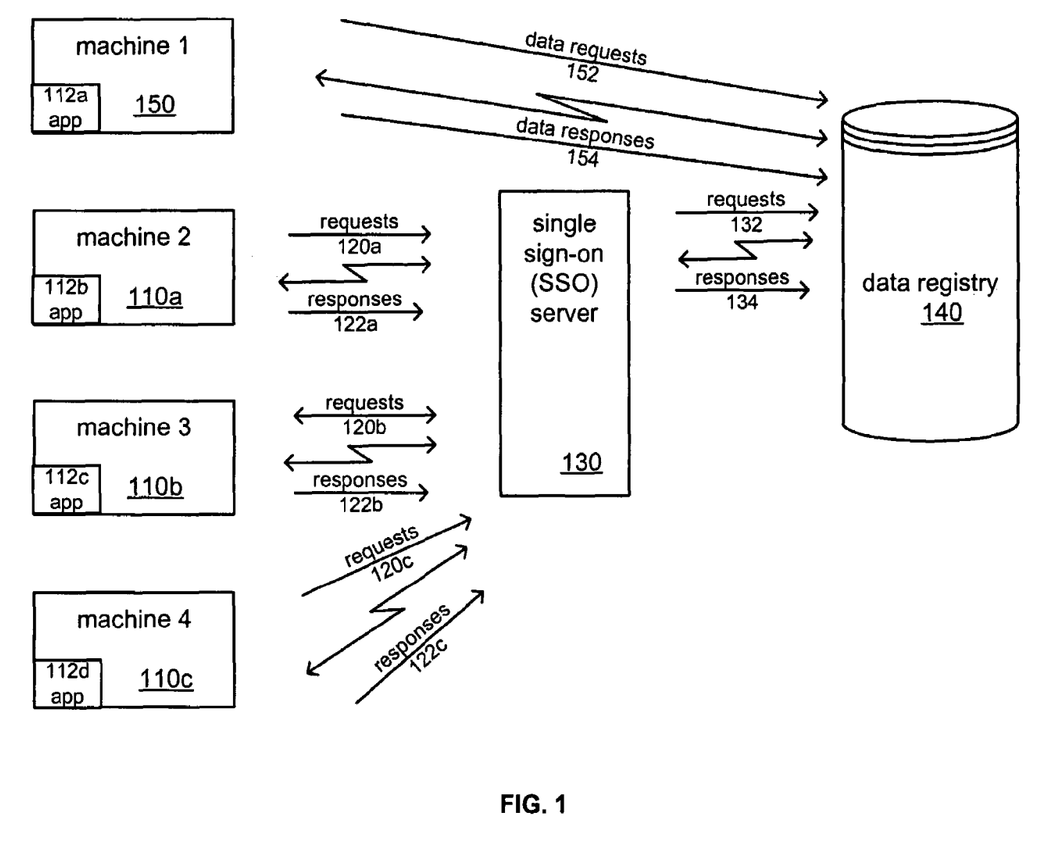
FIG. 1 is a block diagram showing a cross-platform single sign-on data sharing system in accordance with an embodiment of the invention.

FIG. 1 is a block diagram showing a cross-platform single sign-on data sharing system in accordance with an embodiment of the invention. As shown in FIG. 1, applications 112 hosted on different machines 110 & 150 running on different platforms can access data stored in a data registry 140. The data registry 140 can store authentication information such as user identifications ("ids") and passwords that can be accessed to allow a user to be automatically logged on to applications subsequent to an initial global sign-on. The data registry 140 may also store non-authentication data associated with a user, for instance temporary state data relating to the files and programs accessed in a user environment (i.e. what files and programs were open, and in what order), the configuration of a user interface within an application (i.e. font data (size and point), color data, the size of a window, the position of a window, the configuration of a toolbar, and the layout of different application files), and the settings associated with a particular application 112.

A user may save this temporary state data while using the application 112 on one machine operating on one platform, then retrieve it later while using the application on another machine 110 & 150 operating on a different platform. In this way, cross-platform sharing of a variety of kinds of data among different applications 112 in different domains can be accomplished. As used herein, the terms "platform" and "operating platform" include operating systems and environments such as Microsoft Windows, Sun Java Desktop, mainframe operating systems, Internet Explorer or other web browser, Unix, Linux, and the like.

Requests to store or retrieve data 152 can be sent directly from a requesting machine 150 to the data registry 140. If the request 152 is valid and the data is available, then the requested data or a confirmation of the storage of the data will be returned 154 to the requesting machine 150. Alternatively, requesting machines 110 may send more general requests 120 to a single sign-on server 130. The server then processes the requests 120 and determines what access to the data registry will be required to fulfill the requests 120. Based on this determination and knowledge about the configuration of the data registry 140, the single sign-on server 130 sends a data request 132 to the data registry 140, which can then return the requested data 134 or a confirmation that data has been stored as requested 134. The single sign-on ("SSO") server 130 takes this data and processes it to formulate a response 122 to the requesting machine's request 120. It then returns this response 120 to the requesting machine 110.

The system of FIG. 1 facilitates data sharing among a number of different machines including Machines 1-4 110 & 150, the single sign-on server 130, and the data registry 140. Each machine 110 & 150 can comprise a computer, network device, server, terminal, computing system, or other apparatus. The machines 110 & 150 may be configured with relation to each other in any number of ways—for example, they may all reside in the same location, be geographically dispersed, belong to the same enterprise, or be linked over a private or public network. The machines 110 & 150 may operate on different platforms and utilize different operating systems. For instance Machine 1 150 could be a mainframe machine operating in a COBOL environment. Machine 2 110a could be running win32 or another Windows-based operating system, on a Windows platform. Machine 3 110b could be running the Solaris operating system on a SPARC Platform. Machine 4 110c could be a Unix workstation. Other proprietary or open source operating systems running on other platforms, such as those that are Linux-based, could also be used.

Flexibly, the single-sign-on data sharing system of FIG. 1 allows data generated within different various environments to be stored in one place, the data registry 140. It also permits applications 112 on different machines 110 & 150 to share data among instances of the application 112. Each of the applications 112 shown can comprise any computer program designed to provide functionality to a user. It may be launched directly from a user's desktop or may be accessed through a portal, company intranet, or other network. As is known in the art, computers are adapted to execute computer program modules for providing functionality described herein. As used herein, the term "module" can refer to computer program logic for providing the specified functionality. A module can be implemented in hardware, firmware, and/or software. Preferably, a module is stored on a computer storage device, loaded into memory, and executed by a computer processor.

The system of FIG. 1 can store and fetch at least two different kinds of data—authentication data and non-authentication data. In an embodiment, authentication data may take the form of a collection of usernames, passwords, cryptographic or biologic data (e.g., fingerprint or retinal scan), and/or other authentication information associated with (and typically unique to) a single user. The usernames might be associated with applications used by the user, domains within the operating environment, or other virtual sites accessed by the user. In an embodiment of FIG. 1, a global user id and password are assigned to the user, which serve as a kind of key to the other authentication information. The username and password information could be static or dynamic, for instance constantly changed according to a dynamic authenticator such as that used in a SecurID® system offered by RSA Security Inc. of Bradford, Mass.

In one use of the system of FIG. 1, before a user logs on to a system, all of her user names and passwords are collected and stored within the data registry 140. This could be accomplished in any number of ways—a user could provide all of the information to an administrator, who enters it into the data registry 140, for instance. Or a software module could be coded to automatically collect and store of username and password data as a user enters it. Once stored, the authentication data may be retrieved for various purposes related to signing the user on to the system or various applications. In response to a database call 132 to the data registry 140, for instance, the authentication data may be pulled from the data registry 140 and provided through a data response 134 to the single sign-on server 130 to be supplied to an application 112 trying to log on a user. However, if the user is signing on for the first time, a call may simply ask the single sign-on server 130 to validate the application data provided by the user. Other protocols for handling authentication data are also possible.

Non-authentication data may encompass any kind of data other than authentication data. This may include, for instance, environment data describing the appearance of a user's desktop or launch data that specifies the order in which applications should be launched or what options within an application should be elected upon launch. It may also include application and file data that can be saved at various stages during a user's session, including the configuration of elements within an application. Other non-authentication data, including as described above, associated with a user application 112 could comprise a bug number in a problem tracking system, a customer number in a customer relations management application, an invoice number in an purchasing order system, a hostname/program name in a debugger. An application or operating system may be coded to capture and save such non-authentication information automatically, upon a prompt, or at regular intervals. In an embodiment, this information can then be sent to single sign-on server 130 to be stored in the data registry 140.

Alternatively, the data registry 140 is pre-populated with non-authentication information collected from a user or other source. The non-authentication data is stored in the registry 140 in association with the user and the application, which can be identified in the data itself or by a handle or token associated with the data that identifies the requesting entity. Later, when the user, application, or system seeks to call up this non-authentication data, even while operating in a different domain or platform, it can make a request to the data registry 140, through the sign-on server or directly. Once it receives the data, the requesting user, application, or system can use it to customize or populate the user's operating environment. How different types of data generated by different applications and platforms can be uniformly stored and fetched using the same protocol is described in greater detail below in the discussion of Web Services technologies.

As discussed above, requests to fetch 120 & 152 or store data can be made, directly to the data registry 140 or through a single sign-on server 130 in communication with the data registry 140. It may be advantageous for a requesting machine 110 & 150 to be in direct contact with the data registry 140, thereby cutting out the middleman of the single sign-on server 130. Alternatively, if requesting machines 110 & 150 and the registry 140 are geographically dispersed, it may be more efficient for requests to go directly to the data registry 140. Other topologies and maintenance considerations may favor the use of the single point of contact provided by the single sign-on server 130. For instance, when multiple computers 110 & 150 and users require access to the data registry 140, as shown in FIG. 1, it may be beneficial to route all requests 120 & 152 through a single sign-on server 130, thereby allowing requests 120 & 152 to be prioritized and in some cases aggregated more efficiently. This also allows for a central location to perform all logging.

To support this role, the single sign-on server 130 carries out several functions. First, it receives requests from calls made by the requesting application 112, user or system. The single sign-on server 130 then processes these calls, and determines what information, if any, must be retrieved or stored from the data registry 140 to carry out the request. It might identify where in the registry 140 the information should be retrieved or stored, for instance. In another embodiment, the single sign-on server 130 is configured to cache some data locally, for instance based on a priority scheme, so as to avoid the need to always interface with the data registry 140.

In systems where the calls are being sent from different environments, the single sign-on server 130 is equipped with the ability to process data stored in different formats. A single sign-on server 130 may be configured any of a number of different ways. It may be hosted on the same machine 110 as a requesting application 112, or the data registry 140, or be hosted on another server or machine. In some embodiments, the various components of the single sign-on server 130 may reside on different machines in different locations.

As mentioned above, the data registry 140 of FIG. 1 is capable of storing both authentication and non-authentication data. The registry 140 may take various forms—it may comprise, for example, a relational, object-relational, SQL-server, and/or lightweight data access protocol database. Alternatively, the data registry 140 can consist of a collection of data objects, or a data warehouse, or another data repository. The data registry 140 may store authentication and non-authentication data together or may dedicate certain portions of the registry 140 to authentication data and other portions to non-authentication data. As shown in FIG. 1, the data registry 140 is capable of storing information generated by different applications 112 and machines 110 & 150 operating on different platforms.

As shown in FIG. 1, Machines 2, 3 and 4 110 and the single sign-on server 130 typically exchange requests and responses during the course of a single sign-on data sharing session. The machines 110 may access the server through different means. Web Service protocols (e.g., J2EE or net), for instance, may support communications between machines 110 operating on a variety of operating systems and the single sign-on server 130. While the use of Web Services avoids the need to code different, platform-specific calls for each machine 110 to carry out essentially the same functions, more conventional, machine-specific code can also be used to achieve the same result. When the server resides on the same machine 110 as a requesting application 112, calls in the common operating system will support the communication.

As shown, the single sign-on server 130 and Machine 1 150 of FIG. 1 exchange data requests 132 and data responses 134 with the data registry 140. In some embodiments, an abstract data layer resides between the registry 140 and the single-sign-on server 130. This layer facilitates different underlying datastore protocols. For instance, the registry 140 could comprise a RDBMS database, an LDAP database, or flat files. In some embodiments, the specific data request 132 is transported to this abstracted data layer that resides on top of the database communication. By making its data requests 132 to the abstracted data layer, the SSO server 130 can make its data requests 132 in a code format that is independent of what type of database is used. The abstract database layer can take care of the interface with the registry 140, and format the SSO requests accordingly. This allows the SSO server 130 to remain the same regardless of what database structures are used for the registry 140.

Each of the communications protocols described in the preceding two paragraphs may be implemented, in part, over a wireline or wireless local and/or wide area network or may use any conventional networking technology, such as Ethernet, TCP/IP, or HTTP. Individual communications between locations may be supported by an IEEE 1394 FireWire, 802.11 universal serial bus ("USB"), serial, and/or parallel connections.

In the environment shown in FIG. 1, Machines 2, 3 and 4 110, each hosting an application 112, send requests 120 and receive responses 122 from a single sign-on server 130, which communicates with a data registry 140. A fourth machine, Machine 1 150 exchanges data requests 152 and data 154 directly with the data registry 140. However, it is not necessary for every embodiment of the invention to include all of the elements depicted, and other embodiments will include additional elements. Furthermore, the configuration of elements may also vary—for instance each of the single sign-on server 130 and data registry 140 of FIG. 1 could just as easily be hosted on the same machine 110 & 150 as a requesting application 112, and/or share the same machine 110 & 150. In addition the various components of the single sign-on server 130 may be hosted in several, rather than just one, location.

In the system of FIG. 1, the data sharing process begins when a user (User1) logs on to a machine, for example, Machine 2 110*a*, a Unix machine. In one use of a cross-platform single sign-on data sharing system, after logging onto Machine 2 110*a*, User1 opens a web browser and starts an application 112*a*, for instance, a customer call tracking application. Assuming that User1 is not already logged into an SSO supported application, the application prompts User1 for a global username (or id) and password and sets out to authenticate the user on the application. In this case, the verification step is accomplished with an authentication module hosted on the single sign-on server 130.

The global user name and password provided by the user and a request to validate them 120a are sent to the authentication module through the application-single sign-on interface. The authentication module parses the request 120a, and from it, determines that it must compare the user name and password provided to it and User1's authentication information stored in the data registry 140. A call to retrieve the needed data 132 is sent to the data registry 140 via the single sign-on server 130 data registry 140 interface. The data registry 140 returns the data 132 to the authentication module, which then carries out the comparison step. Assuming that the information matches, the authentication module sends back a response 122b to the application conveying that User1 can be signed on based on the information provided. This allows the application 112b and every subsequent application on Machine 2 110a to access the enterprise registry as User1.

The customer call tracking application 112b is coded to periodically save data about the user's session such as the current open customer or call number, as well as the position and size of the application's window. This information is sent to the single sign-on server 130, which in turn oversees its storage to the data registry 140. While browsing a call for a customer, User1 may need to ask a fellow user (User2) a question. Once data about User1's session has been saved to the data registry 140, User1 walks over to User2's office, and they start the same customer call tracking application 112c on User 2's Windows XP system, hosted on Machine 3 110b. The user logs in as User1. Once the application 112c starts, it retrieves User1's data from the data registry 140, and begins with the same customer and call number being open and with the window in the same size and position as User1 left it on User1's Unix machine 150. In this way, work can continue where User1 left off, with minimal lost time and effort.

Although non-authentication data will typically be associated with a particular user in a domain, in an embodiment, the data associated with one user may be accessed and used by other users. This could be particularly useful, for instance, when a user seeks the input of multiple other users to a problem that the user is working on. When prompted, the user can chose to make her data available to a set of other users that can be designated by global username or other identifier. The data can then be made accessible in a shared database entry, or through other means. A user could indicate that certain classes of users should be allowed access or, alternatively, that the data should be made available to all. In another embodiment, after the data is stored, a message alerting other users to the availability of the data can be automatically sent or sent with comments from the generating user. The functionality of data-sharing across users could be coded into the application, which could ask the user what permissions are needed to access the user's non-authentication data. While specific implementations may vary, non-authentication data can thus be shared not only over the different times periods but also different users operating on different platforms.

In the foregoing description of one use of a cross-platform data sharing system, requests 120 & 152 are sent from requesting applications 112 and responses 122 & 154 are generated and delivered back to the application 112 based on data contained in the single sign-on server 130. The requests 120 & 152 described above include the request to authenticate a user, the request to store or set data in the data registry 140, and the request to fetch or get this data when user1 goes to another machine 110 & 150 and accesses the same application 112. In other embodiments of the invention, other requests 120 & 152 and responses 122 & 154 may be desirable.

As discussed above, embodiments of the present invention support the sharing of data across different computers and different platforms. The processing and transport of requests 120 & 152 and responses 122 & 154 in different formats can be accomplished in several different ways. A set of commands and communications can be coded for each different data format. However, this process is laborious and time consuming, multiplies the maintenance burden, and also requires the command receiver, typically the single sign-on server 130, to support all of the different command formats. The use of middleware or enterprise application integration software can ease the burden, but cannot avoid the creation and use of customized code.

Another option is presented by Web Services for allowing different computer systems on different platforms to communicate with each other. Because they rely on platform-neutral industry standards, Web Services technologies enable the various components of a cross-platform data sharing system to use the same protocol for communications. So whether the requesting application 112 is a COBOL application operating on a mainframe or a Windows application written in C++ on a workstation, either one will call a single sign-on server 130, for instance, the application 112 will generically call a Web Service.

Web Services calls to log on a user, set attribute data, and get attribute data can be used to support the cross-platform data sharing system of FIG. 1. The application protocol interface ("API") of Web Services calls is typically defined in Web Services Design Language. ("WSDL") A set or get attribute web service call, for example, will generally comprise at least two fields—one for the key, and one for the value of the key. The key is the name of the aspect or dimension about which information is being saved (e.g. window size or initial menu preference) and the value is the actual value saved (e.g. 2"×6" or initial menus=X,Y,Z). When Web Services calls are used to transport the data, the raw data generated by the application, generally in a text form, will be formatted in XML during transport, and then converted back into text. In an embodiment of the invention, a token or handle identifying the user and the application associated with the call is also passed along with the XML data. In another, this "scope" data can also be defined and formatted into XML for transport through the Web Services call.

Figure 2A:
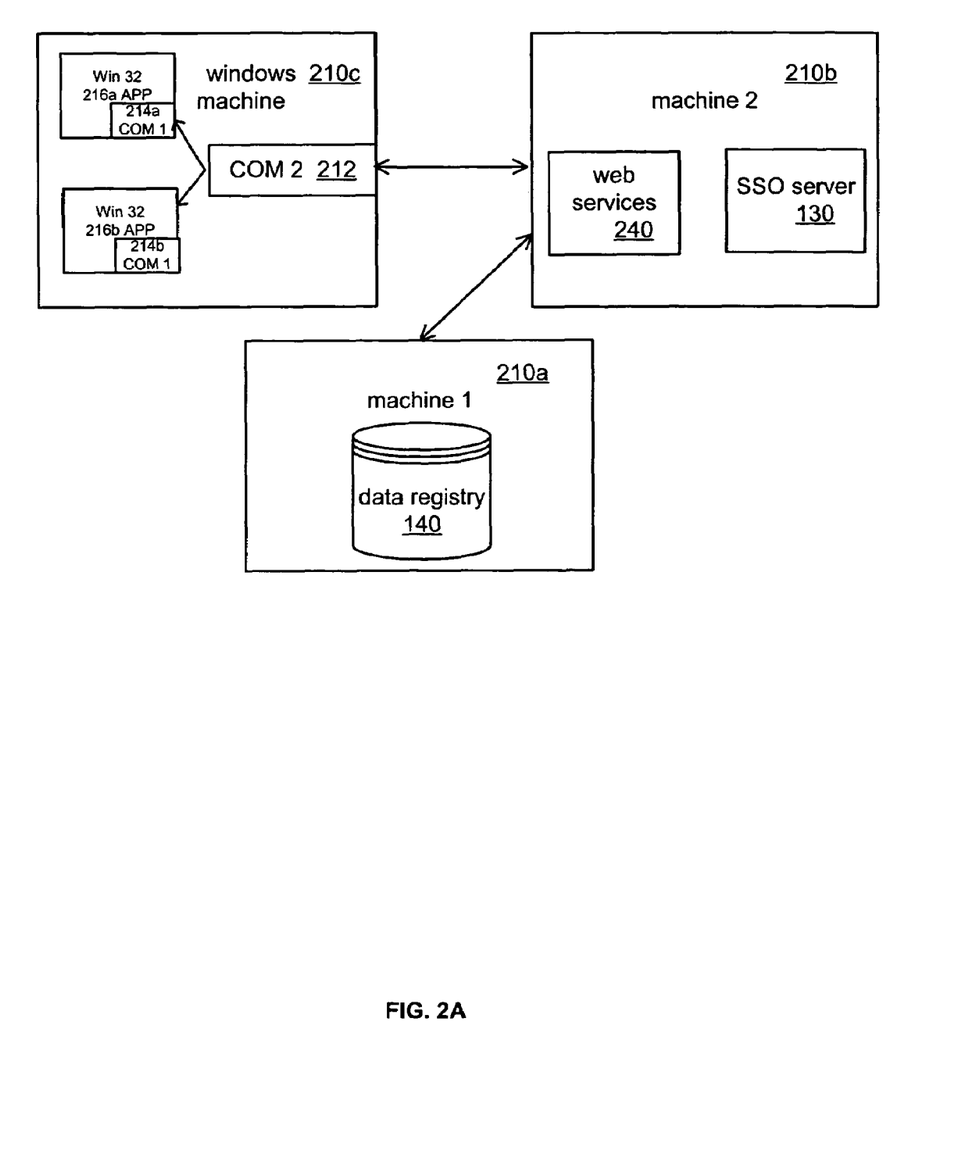
FIGS. 2A-2C illustrate various implementations of a cross-platform data sharing system.
Figure 2B:
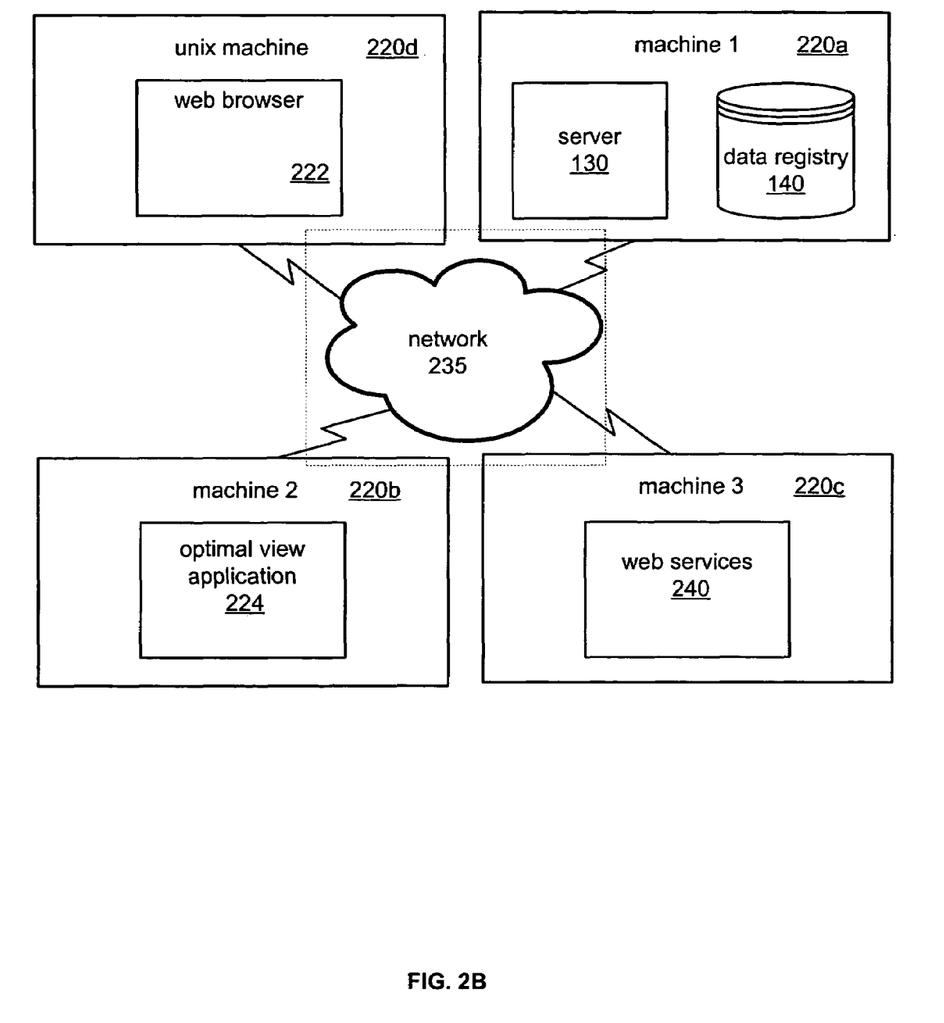
Figure 2C:
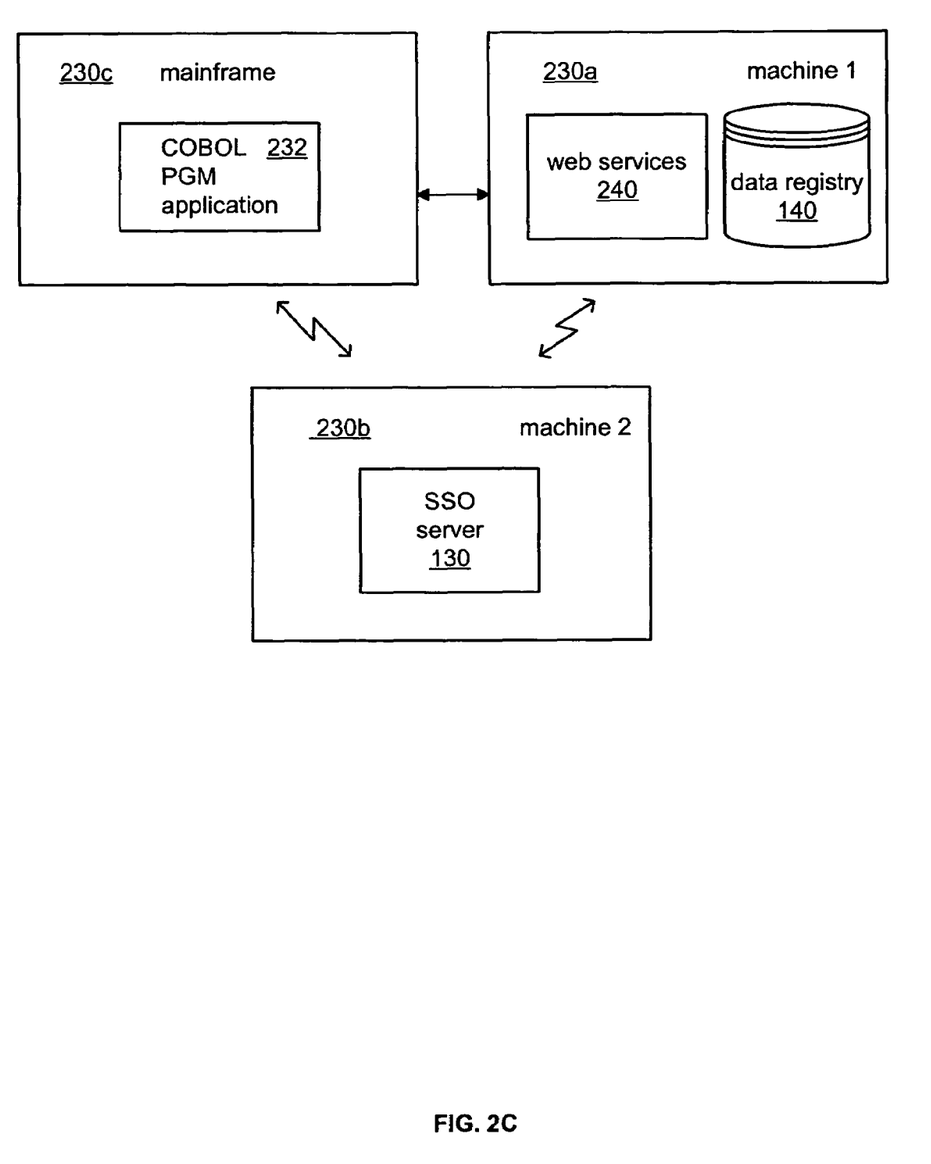

How requests are specifically made can vary depending on a variety of factors including the characteristics of the requesting system, whether requests 120 & 152 are routed through a single sign-on server 130, and aspects of the data registry 140. FIGS. 2A-2C illustrate various implementations of a cross-platform data sharing system. Each uses a different specific protocol for sending requests 120 & 152 and receiving responses 122 & 154 to facilitate data sharing. While these figures are intended to highlight a few possible mechanisms for making requests, they are by no means exhaustive. Furthermore, other configurations using the same request-mechanisms are also possible.

FIG. 2A shows a Windows machine 210c, a data registry 140 and Web Services technologies hosted on Machine 1 210a, and a single sign-on server 130 hosted on Machine 2 210b in accordance with one embodiment of the invention. The Windows machine 210c hosts several win32 applications 216, and includes several Component Object Model ("COM") objects 212 & 214. To make a request, a win32 application 216 communicates directly to an in-process COM object ("COM1") 214. The COM1 object 214 communicates with an out-of-process COM Object, a COM server ("COM2") 212 that also resides on the machine 210c. COM2 212 in turn calls the Web Services that are exposed on Machine 2 210b the same machine 210b that hosts the SSO server 130. Responsive to the request, the SSO server 130 uses JDBC to access the data registry 140 on Machine 1 210a. The server nature of the COM2 server 212 supports the Single Sign-On functionality for the Windows machine 210c, since the COM2 server 212 is managing all connections from various COM1 objects 214. The COM2 Server 212 will recognize subsequent sign-on requests, after the first one, and will not prompt the user for log on information. The COM2 Server 212 will also act as an adapter for the enterprise registry calls to store and fetch data.

FIG. 2B shows a UNIX machine 220d, a single sign-on server 130 and data registry 140 hosted on Machine 1 220a, an application hosted on Machine 2 220b, and Web Services technologies hosted on Machine 3 220c. In accordance with one embodiment of the invention, the UNIX machine 220d hosts a web browser 222 from which the Compuware program Optimal View ("OV") 224, hosted in a remote location, can be launched. The web browser 222 is of a conventional type that provides access to the Internet and processes HTML, XML or other mark up language to generated images on the display device. For example, the web browser 222 could be Netscape Navigator or Microsoft Internet Explorer. As shown, the various machines depicted 220 communicate with each other through a network 235. The network could comprise any combination of RF, IEEE 201.11b, intranet, Internet, LAN, wireline, VPN, or other connections. It is noted that OV 224 is launched from within the web browser 222. Once OV 224 is started, the user is prompted for single sign-on information. OV 224 now can call the Web Services APIs that are implemented on Machine 3 220c to implement all authentication and other request processing through the single sign-on server 130, as well as all enterprise registry stores and fetches. Alternatively, OV 224 can also access the data registry 130 directly, rather than going through the SSO server 130, for performance reasons.

FIG. 2C shows a Cobol PGM program 232 running on a mainframe 230c, Web Services APIs 240 and a data registry 140 hosted on Machine 1 230a, and a single sign-on server 130 hosted on Machine 2 230b. When triggered to save or retrieve non-authentication data, the Cobol program 232 invokes Web Services 240 to access the SSO server 130. The SSO server 130, in turn, accesses the data registry 140 using the abstracted data layer and protocol required by the data registry 140. By invoking the Web Services APIs 240 to carry out its requests, the Cobol program 232 does not need to directly access registry 140.

Figure 3:
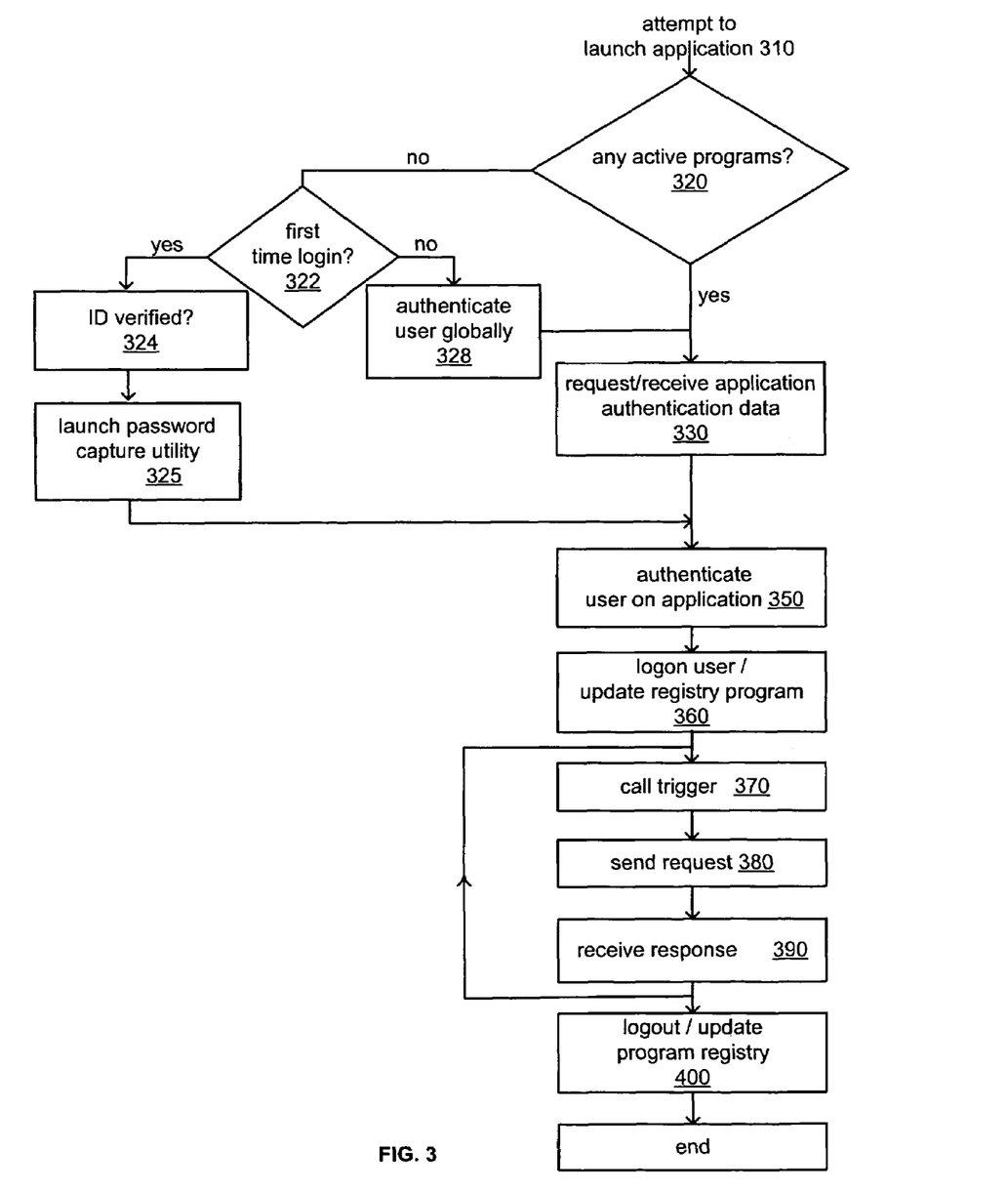
FIG. 3 shows a high-level flow chart that illustrates one series of logical steps in accordance with an embodiment of a cross-platform single sign-on data sharing system.

Although the specific protocols described above may differentiate various cross-platform single sign-on data sharing systems from one another, the same logical sequence can support various implementations of such systems. FIG. 3 shows a high-level flow chart that illustrates one series of logical steps in accordance with an embodiment of a cross-platform single sign-on data sharing system.

According to the flow chart of FIG. 3, use of an embodiment of a cross-platform single sign-on data sharing system begins when a user attempts to launch an application 310. The first step is to determine whether or not the user is already logged into any programs, or, in other words, if there are any active programs associated with the user at the time that she attempts to launch the application 320. This determination can be made by referencing a registry of active programs associated with the user on the system that may be maintained on the same machine as the application or may be stored elsewhere.

If there are no active programs, a second determination is made whether or not the user is logging on to the system for the first time 322. The user may indicate that she is logging in for the first time, for instance by clicking on a specific link on a web page. Alternatively, the mere fact that the user name provided by the user cannot be found in the data registry 140 may cause the system to inquire, and the user to confirm, that the present instance is the first one in which the user is logging on to the single sign-on data sharing system. If this is the case, a verification module may set out to verify the identity of the first time user 324. This module may, for instance, have access to a directory of confidential information comprising pre-assigned passwords or other identifying data such as employee number, birth date, or biological data. The verification module may prompt the user to provide the confidential information, and then compare it against the information in the directory. Alternatively, the verification module can generate and send a confidential password. When the user provides the generated password, her identity is confirmed 324.

Once the user's identity is confirmed, a password capture utility can be launched 325. This utility can be used to create a global user id and password for the user, and capture and store authentication information associated with applications launched during the user's computing session. In one embodiment of the password capture utility, the utility prompts the user to provide a global user id and password according to pre-set criterion, for instance governing the length and alphanumeric characteristics of the password, which are stored to a registry. Subsequently, the password capture utility gathers data about application and domain authentication data associated with the user.

In one embodiment, the password capture utility comprises a wizard tool with a graphical user interface that specifically asks the user for all of the user's authentication information. In another embodiment, the utility uses a scripted dialog to gather the information. It may save the global user ID and password provided by the user as the user name and password for the local application, consistent with the access protocols of the local application. Alternatively, the password capture utility can monitor the user's movements during a computing session. Whenever the user provides a user name and password to access an application, domain, or other site, the utility records the authentication information, and then sends it to a registry to be saved.

If there are no active programs but the user is not logging on for the first time, she is prompted for and provides her global user name and password 320. Although she is now authenticated globally, the user still needs to be authenticated locally for the application she seeks to launch. However, because the user has already been authenticated globally, she is not prompted for this data. Instead, a request to fetch the user authentication data associated with the application is sent 330, and with the data sent in response to this request 330, the application authenticates the user 350.

The steps are similar if there is an active program when the user first attempts to launch the application. The determination that there is an active program signals that the user has already been signed in globally. Therefore, rather than prompting the user for her application authentication information, a request for this information is sent 330, and the user can be authenticated with the information provided 330, 350. In this way, the user never has to provide any application level user names or passwords, but is authenticated automatically at this level. Once the user is logged in, a registry of active program can be updated 360.

After the user is logged on to the application, various triggers to fetch or receive data may be activated 370. For instance, the successful log in of the user could trigger a series of calls to request settings or active session data associated with the user. The calls may ask if there are stored values associated with a key value pair, as discussed above. A response that the data doesn't exist, or that the data does exist and which retrieves the data, can be sent to the application. The application can use settings or session data that it receives in response to its request to customize the user's environment, or restore the user's active session.

Later, during the user's computing session, the application might be triggered to save the temporary state data of the application at regular intervals to allow the user to easily move from one machine to another. Another trigger could be the launch of multiple sub-windows within an application, leading to the requesting 380 and receiving 390 of window configuration data from The registry 140. The process of sending requests 380 and receiving responses, initiated by various call triggers, can happen multiple times over the course of a user session. When the user logs out of the application 400, for instance by closing it down, engaging a log out procedure, or through another mechanism, The registry 140 of active programs is updated 360 to reflect the end of the active session.

To take full advantage of the cross-platform data sharing capabilities of a single-sign-on system, standard applications may need to first be equipped with supplementary functionality. In one embodiment, an application is defined as operating within a certain domain, and is coded to require its users to log on to the application. The application is also coded to invoke Web Services calls to send requests to a single sign-on server 130 to authenticate users and store/fetch data. What particular data may be stored/fetched for use by the application, and what events should serve as triggers for certain calls may also be specified.

For instance, a developer could code an application to make a sequence of get API calls once a user logs on. These calls could comprise getting the user's preferred window width, then window height, then window size, and various user preferences that the application can use to tailor the user's working environment. Alternatively, an application can be coded to automatically save information at regular intervals, or when the application gets closed, or responsive to a user's request.

Figure 4:
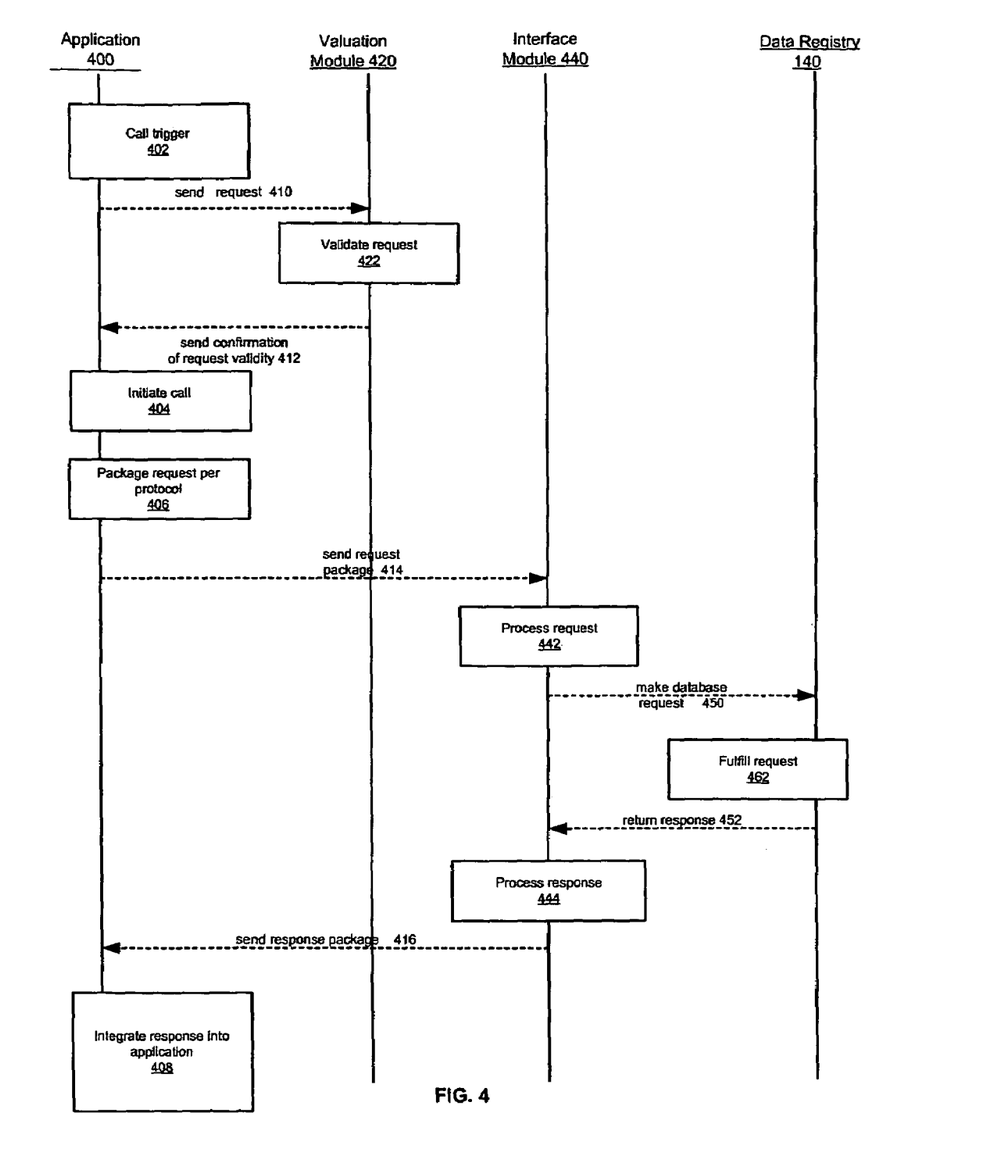
FIG. 4 is an event diagram showing use of a cross-platform single sign-on data sharing system.

FIG. 4 is an event diagram showing use of a cross-platform single sign-on data sharing system. Requests and responses are sent between an application 400, a validation module 420, an interface module 440, and a data registry 140. Different types of authentication or non-authentication data can be transferred through the series of exchanges depicted in FIG. 4.

In an embodiment, a user is logged on to an application 400, for instance, a customer relations management application. At some point during use of the application 400, a call trigger is activated 402, for instance, to prompt a call to store the current customer file, which could be made up of individual customer objects, and settings within which a user is working. The application 400 sends a request 410 to a validation module 420. It may send this request through a COM server or other module, or may be coded to make the request directly. It may ask, for instance, if the customer file can be saved. The scope of the call can comprise instance information—that is, the user using the application—about the request. The scope can also include domain information or a solution name. This identifying scope information is commonly used to identify the context and source of all calls made by the application. The call described in this case comprises a call to store non-authentication data. It could also be however, a call to fetch authentication data, for instance, responsive to the user's launch of a second application, or could be another call entirely.

The validation module 420 receives the request. In an embodiment, the module can tell the scope by looking on an active program list; alternatively, the scope information is passed as part of the request 422 or through an identifying token or handle. The validation module then validates the request by verifying, for instance, that it is being sent in association with a recognized user of the data registry 140, and that the customer file data can be saved. This step may involve querying the data registry 140 or may be determined locally. If the request is determined to be valid, the validation module sends a confirmation to the application 412.

The application 400 then initiates the call 404. The content to be stored is put into a key value pair. A sample name value pair for a call to store current file data could be "currentCustomerfile" for key, and the current customer's data for value. The request is packaged 406 according to the protocol for communication between the requesting application and the interface module. For instance, if a Web Services call is used to send the request, the request is formatted in XML. Together with the handler or token representing the scope, the request and the content are sent 414 via a Web Services call to the interface module 440.

The interface module 440 receives and processes the request 442 from the requesting application 400. The interface module 400 may convert the XML formatted content into text or parse the content according to a Web Services schema as written in WSDL. In an embodiment, if the interface module 400 doesn't recognize the key of the key value pair, it creates a new one. Based on the request 410, in this case, to store the customer file and settings data, the interface module 440 formulates a database request 450. It knows the user and the application that have generated the request from the scope data provided. In an embodiment, the request is sent 450 through an abstracted data layer that resides on top of a communications layer dictated by the formatting requirements of the data registry 140. In this case, the interface module includes a data abstraction handler that manages calls to the data registry 140.

The data registry 140 is configured to store both authentication and non-authentication data. In one embodiment of the invention, the non-authentication data is stored in a key value pair format, while the authentication data is stored in a more conventional table format. The authentication data can be stored in tables containing user, password, application, domain, and machine location information. The non-authentication key value information, on the other hand, is grouped by application and by user. Whereas authentication fields such as user name may be limited, for instance, to an eight-character field, non-authentication data may be stored instead as data objects or undefined text strings. This allows data generated by different applications on different platforms to be commonly stored in the same registry. Thus, although the authentication and non-authentication information is stored in the same registry, it may be stored in different ways to facilitate different data formats.

The database request to store the key value pair in association with the user and the application is sent 450 to the data registry 140. Assuming the request id valid, the data is stored accordingly 462, and a response confirmation 452 is returned to the interface module 440. The interface module in turn processes this response 444 and sends the return value as the response of the Web Services call to the requesting application. The response may be formatted in XML, and is returned to the application 416. Although the foregoing has described a request to store data to the data registry 140, the same process can be used to fetch data from the data registry 140. In such a case, the response returned 452 from the data registry 140 to the interface module 440 contains the requested data. Once the response is processed 444 by the interface module 440, the data is sent 416 to the requesting application 400. The relevant data contained in the response is then integrated into the operation of the application 408.

Figure 5:
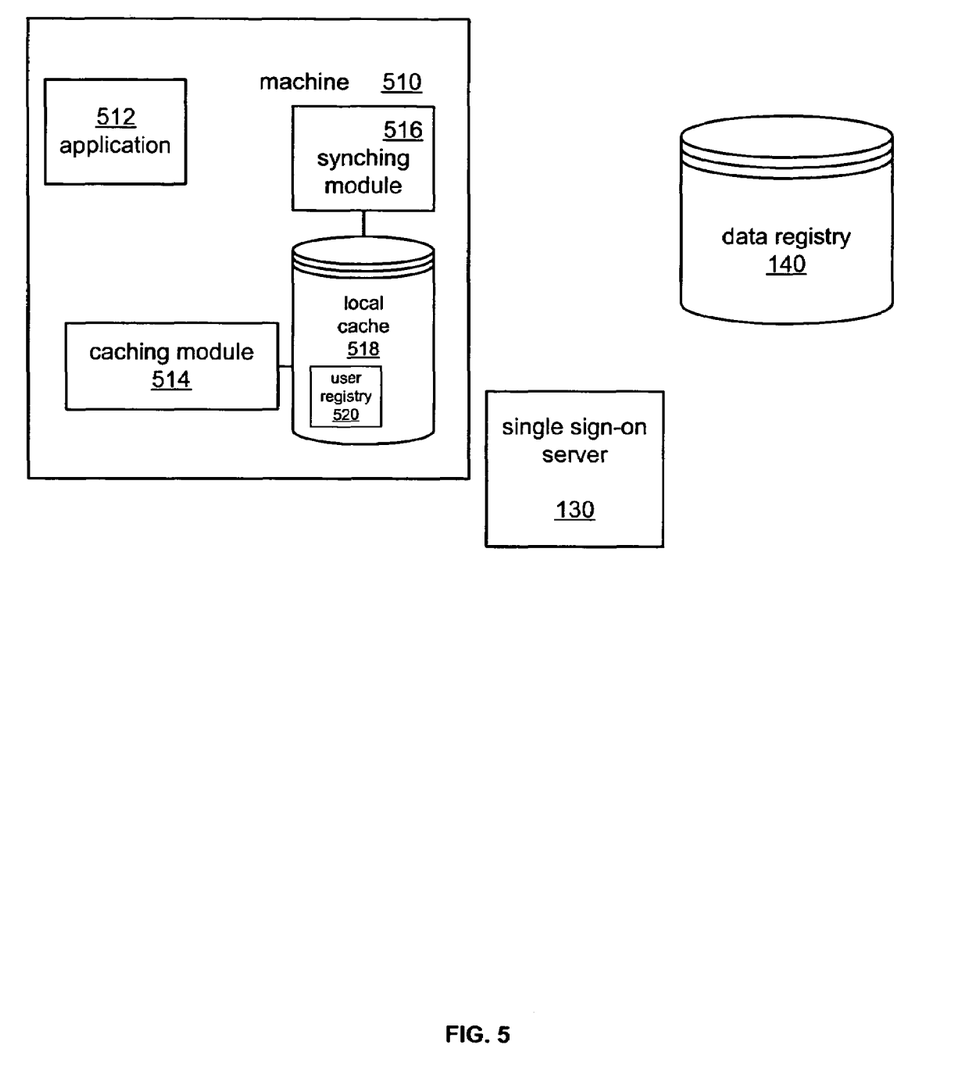
FIG. 5 is an illustration of an offline embodiment of a cross-platform single sign-on data sharing system.

FIG. 5 is an illustration of an offline embodiment of a cross-platform single sign-on data sharing system. Through an offline sign-on procedure, a user can move easily around different machines and still take advantage of the functionality of a single sign-on data sharing system when disconnected from a network. A machine 510, single sign-on server 130, and data registry 140 are featured in FIG. 5. The machine 510 hosts an application 512, a caching module 514, a local cache 518, and a synchronizing module 516. Using the data sharing system of FIG. 5, a user can be authenticated for multiple applications and retrieve and store data based on an initial single sign-on even while disconnected from the data registry 140 and the single sign-on server 130.

When a user wants to activate the offline functionality of a single sign-on data sharing system, a user registry 520 is created and stored in the local cache 518 of the machine. The user registry 520 essentially mirrors the user's records that are stored in the data registry 140. The records in the user registry can be stored in a local XML file or other format. When a user is logged on to an application 512 on the system, from the machine 510 or another machine, the user data in the data registry 140 may be altered or updated.

When a user logs on to the machine 510 and the machine 510 is connected to the single sign-on server 130, a synching module 516 on the machine 510 automatically asks the single sign-on server 130 to retrieve any updated information associated with the user in the data registry 140. The machine 510 uses this to update the user registry in the local cache 518 to reflect any changes, additions, or deletions to the user's records. Changes to the user's records during the computing session are made to the data registry 140, however, when a user is logged off, the updated data is stored to the local user registry 520 in the local cache 518.

When a user logs on to the machine 510 and the machine 510 is not connected to the network, a requesting application 512 can still retrieve user authentication and non-authentication data from the local user registry 520. Non-authentication application data can also be saved to the local user registry 520. The next time the user is logged on to the network, the synching module updates the data registry 140 with the data in the local user registry 520.

What is claimed is:

1. A cross-platform single sign-on system for sharing user data across computers on a plurality of computing platforms, the system comprising:
an authentication module for authenticating a user at the beginning of a computing session;
an interface module configured to receive requests for authentication and non-authentication data associated with the user from a plurality of independent local applications on the plurality of computing platforms and, based upon authentication of the user at the beginning of the computing session and responsive to the requests, to automatically provide authentication and non-authentication data to the plurality of independent local applications throughout the computing session; and
a data registry in communication with the interface module for storing and providing authentication data and non-authentication data responsive to requests made by the plurality of independent local applications.

2. The cross-platform single sign-on system of claim 1, wherein web services technologies are used to transmit requests for authentication and non-authentication data from a plurality of computer systems hosting the plurality of applications to the interface module.

3. The cross-platform single sign-on system of claim 1, wherein the non-authentication data includes state information reflecting a state of a selected local application on a first computer accessed by the user that can be retrieved when the selected local application is being accessed from a second computer.

4. The cross-platform single sign-on system of claim 3, wherein the selected local application is being accessed from a second computer by a second user.

5. The cross-platform single sign-on system of claim 1, wherein the interface module is further configured to receive requests to store authentication and non-authentication data associated with the user from a plurality of independent local applications on a plurality of computing platforms in the computing system and, based upon authentication of a user at the beginning of a computing session and responsive to the requests, to store the data to the data registry.

6. The cross-platform single sign-on system of claim 1, wherein the interface module formats data queries to the data registry in accordance with a data exchange protocol accepted by the data registry.

7. The cross-platform single sign-on system of claim 1, wherein the data registry is further configured to receive requests for authentication and non-authentication data directly from the plurality of independent local applications on the plurality of computing platforms, and for the requested data to be retrieved from the data registry responsive to the requests.

8. The cross-platform single sign-on system of claim 1, wherein a request to retrieve authentication and non-authentication data associated with the user is sent responsive to an event trigger activated during the user's computing session.

9. The cross-platform single sign-on system of claim 8, wherein the event trigger comprises at least one of: the authentication of a user, a user command, and the passage of a pre-determined interval of time.

10. The cross-platform single sign-on system of claim 1, wherein the interface module and authentication module are commonly hosted on a single computer.

11. The cross-platform single sign-on system of claim 1, wherein at least one of the plurality of computing platforms differs from another at least another of the plurality of computing platforms.

12. The cross-platform single sign-on system of claim 1, further comprising:
a caching module for storing non-authentication data generated by an application in the local cache of the computer hosting the local application when the computer is disconnected from the computing system; and
a synchronizing module for sending non-authentication data stored in the local cache to the data registry when the computer is connected to the computing system.

13. The cross-platform single sign-on system of claim 1, wherein the authentication module is configured to detect that a user is logging on to the system for the first time, further comprising:
a verification module in communication with the data registry for verifying the identity of the user;
a password capture utility launched responsive to the successful verification of the user's identity for creating a global user id and password for the user with which the user can be logged on to the cross-platform single sign-on system, capturing user authentication information associated with applications launched during the user's computing session, and storing the authentication information in the data registry.

14. A data registry for storing and providing data across a computing system, the data registry comprising:
   a plurality of user data entries, each of the user data entries describing a unique user of a computing system comprised of a plurality of computing platforms and a plurality of independent local applications;
   a plurality of authentication entries associated with each of the user data entries for authenticating the user on the plurality of independent local applications of the computing system; and
   a plurality of non-authentication attributes and attribute entries associated with each of the user data entries in which information about a user's use of a local application can be preserved.

15. The data registry of claim 14, wherein the non-authentication data includes state information for one of the plurality of independent local applications, whereby a user may switch between a first computer and a second computer and preserve the state of a selected application accessed using the first computer when accessing the selected application from the second computer.

16. The data registry of claim 14, wherein the non-authentication data includes configuration information for one of the plurality of independent local applications with which a user's application environment can be customized.

17. The data registry of claim 14, further comprising an interface module that receives web service requests for storing and providing data from one of the plurality of independent local applications and, responsive to the requests, saves the data to the data registry.

18. A method of sharing data across a computing system, the method comprising:
   subsequent to an initial authentication of a user, receiving requests to authenticate the authenticated user from a plurality of independent local applications on a plurality of computing platforms being accessed by the authenticated user;
   automatically authenticating the authenticated user to the plurality of independent local applications being accessed by the authenticated user responsive to the initial authentication of the user;
   receiving non-authentication data provided by a first instance of the authenticated user using a local application in a first domain;
   storing in a data registry the non-authentication data provided by the first instance of the authenticated user using the local application in the first domain;
   receiving a request for non-authentication data from a second instance of the local application in a second domain; and
   supplying, from the data registry, the requested non-authentication data provided by the first instance of the local application in the first domain to the second instance of the local application in the second domain.

19. The method of claim 18, wherein the second instance of the local application in the second domain is associated with a second user.

20. The method of claim 18, further comprising:
   receiving log on information from a user;
   determining that the user is logging on to the computing system for the first time;
   subsequent to the determination that a user is logging on to the computing system for the first time, verifying the identity of the user;
   prompting the user to supply a user id and password;
   providing the user id and password supplied by the user to a data registry to be stored therein;
   capturing application authentication information provided by the user during the computing session;
   storing the application authentication information provided by the user during the computing session in the data registry wherein the data registry is configured to store authentication and non-authentication data.

21. The method of claim 18, wherein an operating platform used by the first domain differs from an operating platform used by the second domain.

22. The method of claim 18, further comprising storing authentication data in the data registry.

23. The method of claim 18, wherein the non-authentication data provided by the first instance of the application in the first domain comprises configuration information for customizing a user's application environment.

24. The method of claim 18, wherein the non-authentication data provided by the first instance of the local application in the first domain includes state information with which the user's application state from the first instance of the local application in the first domain can be maintained to the second instance of the local application in the second domain.

25. The method of claim 18, wherein storing the non-authentication data comprises:
   configuring a non-authentication data attribute;
   storing a value for the non-authentication data attribute associated with the user; and
   responsive to a request identifying the non-authentication data attribute, providing the value of the non-authentication data attribute to a requesting application.

26. The method of claim 18, wherein the request for non-authentication data associated with the authenticated user is generated responsive to a call trigger.

27. The method of claim 18, wherein the step of receiving non-authentication data provided by a first instance of an application used by the authenticated user comprises receiving the non-authentication data from a synchronizing module on a computer for sending non-authentication data from the local cache of the computer, the data having been stored in the local cache when the authenticated user was disconnected from the networked system.

28. The system of claim 1, wherein the non-authentication data comprises one of:
   configurations data, settings data, or applications data, environment data.

29. The system of claim 1, wherein the non-authentication data comprises one of:
   a size of a window, the configuration of a tool bar, and the selection of open files.

* * * * *

UNITED STATES PATENT AND TRADEMARK OFFICE
CERTIFICATE OF CORRECTION

PATENT NO. : 7,509,672 B1  
APPLICATION NO. : 10/817275  
DATED : March 24, 2009  
INVENTOR(S) : Michael A. Horwitz et al.

It is certified that error appears in the above-identified patent and that said Letters Patent is hereby corrected as shown below:

Column 14, Claim 11, Line 49, please delete "differs from another at" and insert -- differs from at --

Signed and Sealed this

Eighteenth Day of August, 2009

David J. Kappos
*Director of the United States Patent and Trademark Office*